(12) United States Patent
Moix Olive

(10) Patent No.: US 11,675,992 B2
(45) Date of Patent: Jun. 13, 2023

(54) CONFIGURABLE ALARM SYSTEM COMPONENT

(71) Applicant: Carrier Corporation, Palm Beach Gardens, FL (US)

(72) Inventor: Pere Moix Olive, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/121,047

(22) Filed: Dec. 14, 2020

(65) Prior Publication Data

US 2021/0350192 A1 Nov. 11, 2021

(51) Int. Cl.
  *G06K 17/00* (2006.01)
  *G06K 19/07* (2006.01)
  *G08B 19/00* (2006.01)

(52) U.S. Cl.
  CPC ..... *G06K 17/0022* (2013.01); *G06K 19/0723* (2013.01); *G08B 19/005* (2013.01)

(58) Field of Classification Search
  CPC ........ G06K 17/22; G06K 19/22; G06Q 20/20; G06Q 20/208; G07G 1/0045
  USPC ................. 235/375, 492, 380, 487
  See application file for complete search history.

(56) References Cited

U.S. PATENT DOCUMENTS

| | | | |
|---|---|---|---|
| 5,339,072 A | 8/1994 | Agata | |
| 5,473,322 A | 12/1995 | Carney | |
| 6,232,886 B1 | 5/2001 | Morand | |
| 6,816,072 B2 | 11/2004 | Zoratti | |
| 6,844,825 B2 | 1/2005 | Shincovich | |
| 6,940,410 B2 | 9/2005 | Deacy | |
| 6,943,691 B2 | 9/2005 | Chambers | |
| 7,004,784 B2 | 2/2006 | Castle | |
| 7,274,289 B2 | 9/2007 | Kerr et al. | |
| 7,348,875 B2 | 3/2008 | Hughes et al. | |
| 7,847,690 B2 | 12/2010 | Murphy | |
| 8,421,629 B2 | 4/2013 | Carr | |
| 9,082,057 B2 | 7/2015 | McGregor | |
| 10,664,792 B2 * | 5/2020 | Berger | G06Q 10/08 |
| 2004/0129312 A1 | 7/2004 | Cuzzo et al. | |
| 2005/0128093 A1 | 6/2005 | Genova et al. | |

(Continued)

FOREIGN PATENT DOCUMENTS

| | | | | |
|---|---|---|---|---|
| AU | 2004206564 B2 | * | 11/2009 | ......... G06F 17/5004 |
| CN | 108847978 A | * | 11/2018 | ......... H04L 41/0803 |

(Continued)

OTHER PUBLICATIONS

European Search Report for Application No. 20382379.4, dated Oct. 23, 2020; 8 Pages.

*Primary Examiner* — Edwyn Labaze
(74) *Attorney, Agent, or Firm* — Cantor Colburn LLP

(57) ABSTRACT

A component 10 for use in an alarm system includes a component controller 12 and an offline configuration module 14. The offline configuration module 14 includes a passive RFID tag and is configured to receive and store an indication of at least one configuration parameter wirelessly transmitted to the configuration module. Upon initialisation of the component 10, the component controller 12 operates the component 10 in accordance with one or more protocol determined by the at least one configuration parameter indicated by the indication stored by the offline configuration module 14.

19 Claims, 1 Drawing Sheet

(56) References Cited

U.S. PATENT DOCUMENTS

2012/0063385 A1* 3/2012 Yang .................. H04W 4/12
375/259
2013/0082839 A1* 4/2013 Farley ................ G08B 17/06
340/539.27
2020/0394900 A1* 12/2020 Lontka ............... H04N 7/183

FOREIGN PATENT DOCUMENTS

| EP | 2650820 A1 | 10/2013 |
| JP | 2016062371 A | 4/2016 |
| JP | 2019036354 A | 3/2019 |

* cited by examiner

CONFIGURABLE ALARM SYSTEM COMPONENT

FOREIGN PRIORITY

This application claims priority to European Patent Application No. 20382379.4, filed May 8, 2020, and all the benefits accruing therefrom under 35 U.S.C. § 119, the contents of which in its entirety are herein incorporated by reference.

TECHNICAL FIELD

The present disclosure relates to a technique for configuring a component for use in an alarm system.

BACKGROUND

An alarm system, such as a fire alarm system or an intrusion alarm system, comprises a number of components working in unison to detect and raise an alarm in the event of a change in a monitored environmental parameter. A typical alarm system comprises a plurality of component devices, such as detectors, manual call points and notification appliances, which are connected to form a robust infrastructure that is managed centrally from a control panel.

Manufacturers of components for use in alarm system will often design components that are interoperable with multiple different alarm systems. However, end users prefer to receive a pre-configured component that can be connected directly to the control panel of their alarm system without the need for configuration on site. Consequently, components for alarm systems are typically supplied in a pre-configured form.

In order to supply pre-configured components, the end user will specify a number of configuration parameters for the product at the time of order. This may include a communications protocol to be used, for example determined by the manufacturer of the control panel, details of the environment where the component is to be deployed, the country where the component is to be deployed, and the like. However, this results in a significant number of possible variants for each component meaning that components cannot be stockpiled by the component manufacturer and must instead be produced and configured after an order has been made.

It has been proposed to stockpile a basic pre-configuration component and to then configure the component after the configuration parameters are received. However, this is a complex process as each component must be recovered from storage, individually powered on, programmed and then packaged for delivery to the end user.

A need therefore exists for an improved alarm system component.

SUMMARY

Viewed from a first aspect, the present disclosure provides a component for use in an alarm system comprising: a component controller; and an offline configuration module, wherein the offline configuration module is configured to receive and store an indication of at least one configuration parameter wirelessly transmitted to the configuration module, and wherein the component controller is configured to, upon initialisation of the component, operate the component in accordance with the at least one configuration parameter indicated by the indication stored by the offline configuration module.

The described component may advantageously be configured after assembly to operate in accordance with the one or more configuration parameters. The configuration parameters may define which protocols the component should implement or follow during operation. For example, a manufacturer may only require one production line to produce each component, which can then be customised to operate in accordance with any number and combination of configuration parameters depending on the end user's system requirements.

Providing an offline configuration module enables the component to wirelessly receive and store an indication of the at least one configuration parameter, so that the configuration can occur while the component is not installed in the alarm system and/or connected to power. In some implementations, it is envisaged that this might be performed after packaging and/or storage of the component. This allows a non-configured component to be stockpiled and then straightforwardly and efficiently configured once the required configuration parameters, which may include at least one protocol, are received.

The offline configuration module may be configured to use radio-frequency (RF) communication, and may comprise an RFID tag. Preferably, the offline communication module comprises a passive RFID tag. That is to say, the RFID tag may be configured to draw power from an RF excitation field to power the RFID tag. The use of a passive RFID tag advantageously means that it is not necessary to include a battery. RFID tags including batteries have a limited shelf-life and are larger and more expensive than passive RFID tags.

Furthermore, RFID readers do not require line-of-sight in order to interact with tags which can increase speed and efficiency of the configuration. For example, the use of RFID may allow for a fully packaged product to be configured, which was not previously possible.

The offline configuration module may be an active or semi-passive RFID tag, and may comprise a battery. That is to say, the RFID tag may be configured to draw power from an internal battery for RF communication over increased distances relative to a passive RFID tag. However, more preferably, the RFID tag is a passive RFID tag.

The offline configuration module may comprise a memory, wherein the indication of at least one configuration parameter is stored. The memory may be electrically erasable, programmable, read-only memory (EEPROM). The configuration memory may be read-write or write-once, read-many (WORM).

The component controller may be configured to, upon initialisation of the component, acquire the indication of at least one configuration parameter from the offline configuration module. The component may initialise upon connection to a power source. Initialisation of the component may comprise the installation within an alarm system and subsequent activation and start-up procedure of the component controller. The component controller acquiring the indication of at least one configuration parameter from the offline configuration module upon initialisation provides a more robust automated system.

The component controller may comprise a memory, wherein a plurality of protocols are stored.

The component controller may be configured to, in response to the indication of at least one configuration parameter, activate at least one protocol out of the plurality of protocols stored in the component memory. Thus, the component controller may be configured to operate in accordance with at least one of the plurality of protocols based on the indication of the at least one configuration parameter. Storing the plurality of protocols in the component memory, and only storing a flag/indication of the at least one configuration parameter (which may define which protocol(s) are to be activated) in the configuration memory, allows the component to be configured quickly as only a small amount of data needs to be transmitted to the offline configuration module.

The component may be configured in a configuration zone. A configuration zone may comprise an environment the component can be brought into to be configured. For example, a wireless signal containing an indication of the at least one configuration parameter may be transmitted to each component brought into the configuration zone. RFID readers and the like do not require line-of-sight in order to interact with tags, such that a configuration zone can be arranged. Multiple components may be configured simultaneously when brought into a configuration zone, which can increase the speed and efficiency of the configuration. In particular, the multiple components may be configured using the same configuration parameters. For example, a single wireless signal may be broadcast to all components within the configuration zone, or individual wireless signals containing the same configuration parameters may be transmitted to each component within the configuration zone.

The plurality of protocols may include communication protocols and/or operational protocols. Communication protocols define the rules and synchronisation of communication between two or more components in a communications system such as an alarm system. Operational protocols direct and control the standard operation and maintenance modes of the component. This may include ensuring the component is compliant with one or more industry and/or national standards. The plurality of protocols may also include management procedures that handle the processes and practices of the component and the alarm system.

The alarm system may be a fire alarm system.

The component may be an initiating component, which may be a fire detection component, such as a heat detector or a smoke detector, or which may be a manual call point.

The component may be a fire alarm control panel, preferably an addressable fire alarm control panel.

The component may be a fire suppression component such as a sprinkler system or fire door holder.

The component may be a fire notification component, such as a visual or audible fire alarm, or voice evacuation system.

The alarm system may be an intrusion alarm system.

The component may be an infrared or motion sensor.

Viewed from a second aspect, the present disclosure provides a method of configuring a component for an alarm system, the method comprising: receiving, by an offline configuration module of the component, wireless transmission of an indication of at least one configuration parameter; and storing, by the offline configuration module, the indication of the at least one configuration parameter, wherein a component controller of the component is configured to, upon initialisation of the component, operate the component in accordance with the at least one configuration parameter indicated by the indication stored by the offline configuration module.

The component may be as discussed above in the first aspect and optionally may include any/all of the further features discussed above.

The storing of the indication of the at least one configuration parameter may comprise storing the indication of the at least one configuration parameter in a memory of the offline configuration module.

The component controller may be configured to, upon initialisation of the component, acquire the indication of the at least one configuration parameter from the offline configuration module. The component may initialise upon connection to a power source. Initialisation of the component may comprise the installation within an alarm system and subsequent activation and start-up procedure of the component controller.

The component controller may be configured to, in response to acquiring the indication of the at least one configuration parameter, activate a protocol stored in a memory of the component and indicated by the at least one configuration parameter.

The method may comprise broadcasting a wireless transmission from a transceiver. The wireless transmission may be a radio frequency (RF) signal and the transceiver may be an interrogator.

The method of configuring the component for an alarm system may be performed by a customer after purchase.

The method of configuring the component for an alarm system may be performed by a manufacturer, and may be performed after production of the physical component and/or after the component has been packaged.

The method of configuring the component for an alarm system may further comprise establishing a configuration zone. Within the configuration zone, a wireless signal containing an indication of the at least one configuration parameter is transmitted to each component brought into the configuration zone. The method may comprise bringing the component into a configuration zone.

The component may be one of a plurality of components brought into the configuration zone simultaneously. Thus, the method of configuring the component for an alarm system may comprise configuring multiple components simultaneously by bringing them into the configuration zone.

BRIEF DESCRIPTION OF THE DRAWINGS

A preferred embodiment will now be described in greater detail, by way of example only and with reference to the drawings, in which.

DETAILED DESCRIPTION

Figure 1:
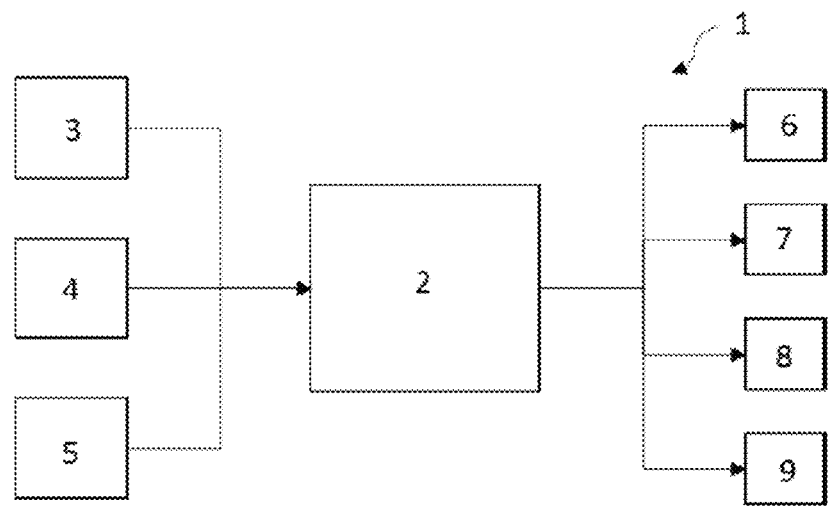
FIG. 1 shows a schematic illustration of a fire alarm system.

FIG. 1 shows a fire alarm system 1.

The fire alarm system 1 comprises a fire alarm control panel 2 that monitors inputs from a plurality of initiating components, processes data from the initiating components, and controls notification components and/or fire suppression systems.

The initiating components of the fire alarm system 1 include components that are automatically actuated, such as smoke detector 3 and heat detector 4, as well as manually actuated components, such as manual call point 5.

The notification components of the fire alarm system 1 include a visual fire alarm 6 and an audible fire alarm 7. The fire suppression systems of the fire alarm system 1 include a sprinkler system 8 and a fire door holder system 9.

The fire alarm system 1 exchanges information with all of the components comprised in its network through wired or wireless communication. The 'language' of the communication between the component parts of the network, referred to as the communication protocol, defines the system of rules, syntax, semantics and synchronisation that each component must follow in order to receive and transmit information compatibly within the fire alarm system 1. A single communication could be subject to the rules and conventions set out by multiple communication protocols. The communication protocol is typically defined by the manufacturer of the fire alarm control panel 2.

If any of the components of the fire alarm system 1 break or become faulty, it may become necessary to replace them. However, because the fire alarm system 1 communicates via a particular communication protocol, a replacement part must also communicate via this particular communication protocol. There are a large number of communication protocols, as well as operational protocols and other associated configuration parameters. It would be beneficial to provide a component that could be configured post-assembly in order to operate according to protocols selected by a manufacturer or user.

Advantageously, a non-configured component can be mass produced via a single production line and stockpiled in a storage warehouse. Such a component can then be configured, at the time of order, according to a plurality of configuration parameters specified by the requirements of the fire alarm system 1 of an end user.

Whilst the fire alarm system 2 is illustrated as comprising a particular configuration of initiating devices and notification devices, the techniques described herein are applicable to fire alarm systems 2 comprising only some of these components and/or including additional components not discussed explicitly herein.

Figure 2:
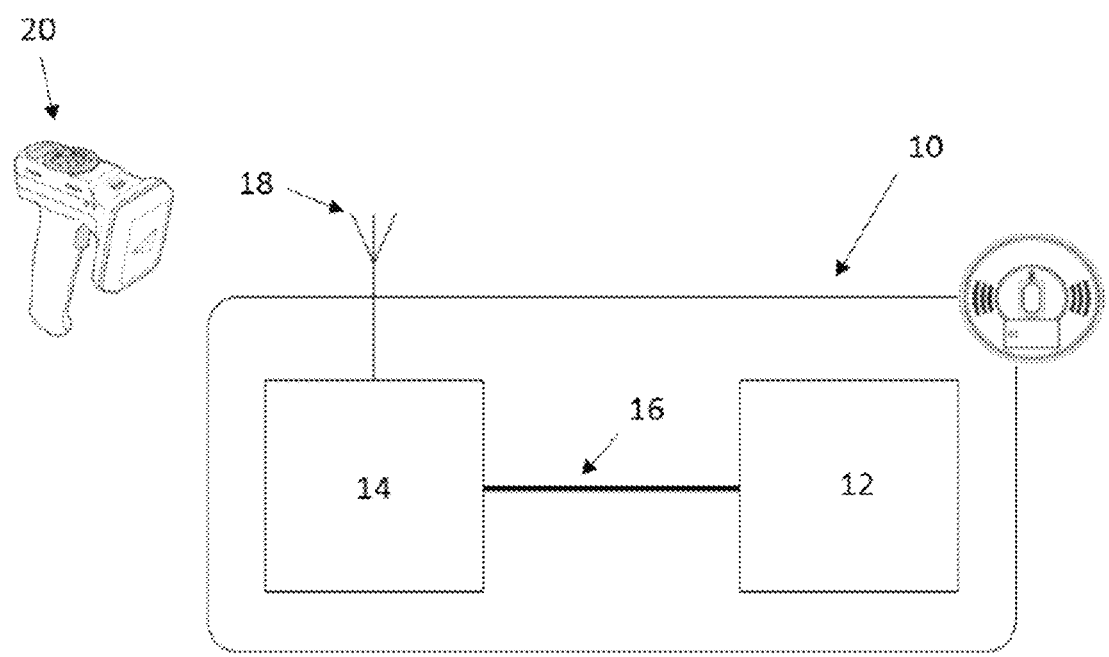
FIG. 2 shows a schematic illustration of a configurable smoke detector for use in the fire alarm system of FIG. 1.

FIG. 2 shows a configurable smoke detector 10 for use in the fire alarm system 1.

The smoke detector 10 comprises a component controller 12. The controller 12 could be any microcontroller or processor suitable for controlling the smoke detector 10 during normal operation, i.e. after the smoke detector 10 has been initialised in a fire alarm system 1.

The component controller 12 is configured to operate the smoke detector 10 during normal operation, for example, detecting an increase in smoke levels, determining that the smoke levels exceed a predetermined threshold value, and communicating to fire alarm control panel 2 via a network that the smoke levels have exceeded the threshold value.

The smoke detector 10 also comprises an offline configuration module 14. The offline configuration module 14 of the smoke detector 10 is a RFID tag and comprises an antenna 18 for receiving and transmitting wireless signals. The RFID tag 14 is a passive RFID tag and therefore does not include an internal battery. That is to say, the antenna 18 can draw power from an RF (radio frequency) excitation field to power the operation of the RFID tag 14. Therefore, the offline configuration module 14 can still operate even when power is not being supplied to the component controller 12.

The component controller 12 is configured to internally communicate with the offline configuration module 14 through a digital interface 16.

During manufacture of the smoke detector 10, the component controller 12 is programmed to operate in accordance with any of a plurality of configuration parameters, comprising communication and operational protocols, and the like. Thus, the relevant protocols and the like may be programmed into a memory (not shown) of the component controller 12 during manufacture, but the controller 12 is not initially configured to implement the protocols.

Instead the component controller 12 is configured to, upon initialisation, acquire from the offline configuration module 14 a stored indication of at least one configuration parameter, which defines what protocol(s) the controller 12 should implement.

The smoke detector 10 begins an initialisation procedure upon supply of power to the component controller 12, which typically occurs following installation in the fire alarm system 1. Initialisation of the smoke detector 10 comprises the subsequent activation and start-up procedure of the component controller 12.

After initialisation, the component controller 12 implements operational protocols for the smoke detector 10. For example, a predetermined threshold value may be set by industry or national safety standards, which can be configured using the offline configuration module 14. The component controller 12 also follows a communication protocol(s) of the fire alarm system 1 when communicating with the fire alarm control panel 2, which can be configured using the offline configuration module 14.

A method of configuring the smoke detector 10 for use in the fire alarm system 1 is now described.

A selection of configuration parameters are input into an RF transceiver 20. The configuration parameters may, for example, be determined based on an end user's specification when ordering a particular component. For example, the end user may specify a device for use with a particular fire control panel 2, and the configuration parameters may define the communication protocol corresponding to that fire control panel 2. Likewise, the end user may specify a device for use in a specific country and in a particular environment, and the configuration parameter may define the corresponding smoke detection sensitivity thresholds for that environment under the regulations of that country.

The RF transceiver 20 then generates a wireless signal containing an indication of the configuration parameters that the smoke detector 10 is to use.

The RF transceiver 20 generates an RF excitation field around itself within which a non-configured component will be configured in accordance with the configuration parameters. This area may be described as a configuration zone.

Upon the offline configuration module 14 being brought into a configuration zone, the RFID tag of the offline configuration module 14 will be energised. The antenna 18 of the offline configuration module 14 harvests power from the excitation field for the operation of the offline configuration module 14 and receives the wireless signal. The offline configuration module 14 stores the indication of the at least one protocol contained within the wireless signal. Optionally, the offline configuration module 14 may then transmit via antenna 18 a confirmation to the transceiver 20 that the indication of the at least one protocol has been stored.

Upon subsequent initialisation of the configured smoke detector 10, as described above, the controller 12 queries the offline configuration module 14 to acquire the stored indication of the at least one configuration parameter. Once the controller 12 has acquired the stored indication of the at least one configuration parameter, the controller 12 can operate in accordance with the at least one protocol as designated by the stored indication.

The configuration of the smoke detector 10 can occur at any point between production and initialisation of the smoke detector 10. The configuration can be carried out by a manufacturer. This can include configuring the smoke detector 10 after the smoke detector 10 has been packaged and stored in a warehouse.

The smoke detector 10 can be configured by an end user prior to initialisation of the smoke detector 10 within fire alarm system 1.

Advantageously, the use of an RFID tag within the offline configuration module 14 means that the smoke detector 10 does not need to be physically connected, for example to a computer and/or power source. This means that the smoke detector 10 can be configured after packaging, allowing configuration to be performed after manufacture has been completed, or indeed after the smoke detector 10 has left the factory.

Furthermore, the use of RFID allows multiple smoke detectors 10 to be quickly configured in accordance with the same configuration parameters. For example, given a sufficiently powerful transceiver 20, an entire pallet of packaged smoke detectors 10 may be placed within the configuration zone, whereby each smoke detector 10 will receive the same indication of configuration parameters at the same time. Alternative embodiments may include, for example, a transceiver 20 arranged adjacent to a moving belt, whereby smoke detectors 10 are configured as they pass the transceiver 20 on the belt.

In some embodiments, the smoke detector 10 may be configured to undergo one and only one configuration process, i.e. the indication of the at least one configuration parameter is permanently stored in the offline configuration module 14 and cannot be overwritten in the event the offline configuration module 14 receives any subsequent wireless signals containing further indications of configuration parameters.

Alternatively the smoke detector 10 could be configured more than once, wherein the previously stored indication is written over in response to receiving a subsequent wireless signal containing a new indication of at least one configuration parameter. For example, smoke detector 10 could be brought into a configuration zone by accident and receive an incorrect indication of at least one configuration parameter. The smoke detector 10 can then be reconfigured according to the original method as discussed above.

The techniques discussed herein are applicable to any component of a fire alarm system 1, such as the fire alarm control panel 2 or any of the initiating devices or notification devices described above. Furthermore, whilst the techniques disclosed herein have been described in the context of a fire alarm system 1, they may be employed in components for other alarm systems, such as an intrusion alarm system.

What is claimed is:

1. A component for use in an alarm system comprising:
a component controller in the component comprising a memory storing a plurality of protocols; and
an offline configuration module in the component,
wherein the offline configuration module in the component is configured to receive and store an indication of at least one configuration parameter wirelessly transmitted to the offline configuration module in the component, when the component is not connected to a power source,
wherein the component controller is configured to, upon connection of the component to a power source, acquire the indication of the at least one configuration parameter from the offline configuration module in the component and operate the component in accordance with at least one of the plurality of protocols based on the at least one configuration parameter indicated by the indication stored by the offline configuration module in the component.

2. A component according to claim 1, wherein the offline configuration module in the component comprises an RFID tag.

3. A component according to claim 2, wherein the RFID tag is a passive RFID tag.

4. A component according to claim 1, wherein the alarm system is a fire alarm system or an intrusion alarm system.

5. A component according to claim 4, wherein the component is one of: a heat detector, a smoke detector, a manual call point, a fire alarm control panel, a sprinkler system, a fire door holder, a visual or audible fire alarm, a voice evacuation system, an infrared sensor and a motion sensor.

6. A component according to claim 1, wherein each of the plurality of protocols is a communication protocol for receiving and transmitting information compatibly within a particular alarm system.

7. A component according to claim 1, wherein the component controller is configured to communicate with the offline configuration module through a digital interface internally within the component.

8. A method of configuring a component for an alarm system, the method comprising:
receiving, by an offline configuration module in the component when the component is not connected to a power source, wireless transmission of an indication of at least one configuration parameter; and
storing, by the offline configuration module in the component when the component is not connected to a power source, the indication of the at least one configuration parameter,
wherein a component controller in the component is configured to, upon connection of the component to a power source:
acquire the indication of at least one configuration parameter from the offline configuration module in the component; and
in response to acquiring the indication of at least one configuration parameter, activate a protocol stored in a memory of the component controller in the component and indicated by the at least one configuration parameter.

9. A method according to claim 8, further comprising:
establishing a configuration zone, wherein a wireless transmission containing an indication of the at least one configuration parameter is transmitted to each component brought into the configuration zone; and
bringing the component into the configuration zone.

10. A method according to claim 9, wherein the component is one of a plurality of components brought into the configuration zone simultaneously.

11. A method according to claim 8, further comprising:
broadcasting a wireless transmission from a transceiver; preferably wherein the wireless transmission is a radio frequency (RF) signal and the transceiver is an interrogator.

12. A method according to claim 8, wherein the method is performed after production of the physical component has been completed.

13. A method according to claim 8, wherein the method is performed after the component has been packaged.

14. A method according to claim 8, wherein each of the plurality of protocols is a communication protocol to receive and transmit information compatibly within a particular alarm system.

15. A method of configuring a plurality of components for alarm systems, the method comprising:
establishing a configuration zone, wherein a wireless transmission containing an indication of at least one configuration parameter is transmitted to each component brought into the configuration zone;

bringing the plurality of components into the configuration zone simultaneously;

receiving, by an offline configuration module in each component when each component is not connected to a power source, the wireless transmission of the indication of the at least one configuration parameter; and storing, by the offline configuration module in each component when each component is not connected to a power source, the indication of the at least one configuration parameter, wherein a component controller in each component is configured to, upon connection of the component to a power source, operate the respective component in accordance with the at least one configuration parameter indicated by the indication stored by the offline configuration module in that component.

16. A method according to claim 15, further comprising:
broadcasting a wireless transmission from a transceiver; preferably wherein the wireless transmission is a radio frequency (RF) signal and the transceiver is an interrogator.

17. A method according to claim 15, wherein the method is performed after production of each physical component has been completed.

18. A method according to claim 15, wherein the method is performed after each component has been packaged.

19. A component for use in an alarm system comprising:
a component controller; and
an offline configuration module,
wherein the offline configuration module is configured to receive and store an indication of at least one configuration parameter wirelessly transmitted to the offline configuration module, when the component is not connected to a power source,
wherein the indication of at least one configuration parameter is determined for the component independent of other components of the alarm system, and
wherein the component controller is configured to, upon connection of the component to a power source, operate the component in accordance with the at least one configuration parameter indicated by the indication stored by the offline configuration module.

* * * * *